United States Patent
Hyvonen et al.

(10) Patent No.: US 10,540,094 B2
(45) Date of Patent: Jan. 21, 2020

(54) EXTENDED UTILIZATION AREA FOR A MEMORY DEVICE

(71) Applicant: Memory Technologies LLC, Las Vegas, NV (US)

(72) Inventors: Jani Hyvonen, Tampere (FI); Kimmo J. Mylly, Ylojarvi (FI); Jussi Hakkinen, Tampere (FI); Yevgen Gyl, Tampere (FI)

(73) Assignee: Memory Technologies LLC, Kirkland, WA (US)

( * ) Notice: Subject to any disclaimer, the term of this patent is extended or adjusted under 35 U.S.C. 154(b) by 0 days.

(21) Appl. No.: 15/181,293

(22) Filed: Jun. 13, 2016

(65) Prior Publication Data

US 2016/0357436 A1    Dec. 8, 2016

Related U.S. Application Data

(63) Continuation of application No. 14/732,507, filed on Jun. 5, 2015, now Pat. No. 9,367,486, which is a
(Continued)

(51) Int. Cl.
*G06F 12/00* (2006.01)
*G06F 12/06* (2006.01)
(Continued)

(52) U.S. Cl.
CPC ............ *G06F 3/061* (2013.01); *G06F 3/0659* (2013.01); *G06F 3/0673* (2013.01);
(Continued)

(58) Field of Classification Search
CPC combination set(s) only.
See application file for complete search history.

(56) References Cited

U.S. PATENT DOCUMENTS

| 3,653,001 A | 3/1972 | Ninke |
| 5,710,931 A | 1/1998 | Nakamura et al. |

(Continued)

FOREIGN PATENT DOCUMENTS

| AU | 2005200855 | 9/2004 |
| CN | 1517886 A | 8/2004 |

(Continued)

OTHER PUBLICATIONS

Office Action for U.S. Appl. No. 15/335,688, dated Mar. 24, 2017, Olli Luukkainen, "Apparatus and Method to Share Host System RAM with Mass Storage Memory RAM", 5 pages.
(Continued)

*Primary Examiner* — Yong J Choe
(74) *Attorney, Agent, or Firm* — Lee & Hayes, P.C.

(57) ABSTRACT

Methods, systems and devices for configuring access to a memory device are disclosed. The configuration of the memory device may be carried out by creating a plurality of access profiles that are adapted to optimize access to the memory device in accordance with a type of access. For example, when an application with specific memory access needs is initiated, the memory access profile that is designed for that particular access need may be utilized to configure access to the memory device. The configuration may apply to a portion of the memory device, a partition of the memory device, a single access location on the memory device, or any combination thereof.

22 Claims, 5 Drawing Sheets

Related U.S. Application Data continuation of application No. 13/951,169, filed on Jul. 25, 2013, now Pat. No. 9,063,850, which is a continuation of application No. 13/645,588, filed on Oct. 5, 2012, now Pat. No. 8,601,228, which is a continuation of application No. 12/039,672, filed on Feb. 28, 2008, now Pat. No. 8,307,180.

(51) Int. Cl.
| | |
|---|---|
| *G06F 3/06* | (2006.01) |
| *G06F 13/16* | (2006.01) |
| *G11C 7/20* | (2006.01) |
| *G06F 12/14* | (2006.01) |
| *G06F 13/28* | (2006.01) |
| *G06F 21/79* | (2013.01) |

(52) U.S. Cl.
CPC ...... *G06F 12/0646* (2013.01); *G06F 12/1458* (2013.01); *G06F 13/1694* (2013.01); *G06F 13/28* (2013.01); *G11C 7/20* (2013.01); *G06F 12/1433* (2013.01); *G06F 12/1441* (2013.01); *G06F 21/79* (2013.01); *G06F 2212/1052* (2013.01); *Y02D 10/13* (2018.01); *Y02D 10/14* (2018.01)

(56) References Cited

U.S. PATENT DOCUMENTS

| | | | |
|---|---|---|---|
| 5,781,753 | A | 7/1998 | McFarland et al. |
| 5,805,882 | A | 9/1998 | Cooper et al. |
| 5,809,340 | A | 9/1998 | Bertone et al. |
| 5,822,553 | A | 10/1998 | Gifford et al. |
| 5,924,097 | A | 7/1999 | Hill et al. |
| 6,115,785 | A | 9/2000 | Estakhri et al. |
| 6,122,196 | A | 9/2000 | Tanaka et al. |
| 6,173,425 | B1 | 1/2001 | Knaack et al. |
| 6,226,710 | B1 | 5/2001 | Melchior |
| 6,279,114 | B1 | 8/2001 | Toombs et al. |
| 6,373,768 | B2 | 4/2002 | Woo et al. |
| 6,480,936 | B1 | 11/2002 | Ban et al. |
| 6,522,586 | B2 | 2/2003 | Wong |
| 6,526,472 | B2 | 2/2003 | Suzuki |
| 6,609,182 | B1 | 8/2003 | Pedrizetti et al. |
| 6,681,304 | B1 | 1/2004 | Vogt et al. |
| 6,732,221 | B2 | 5/2004 | Ban |
| 6,785,764 | B1 | 8/2004 | Roohparvar |
| 6,901,298 | B1 | 5/2005 | Govindaraj et al. |
| 7,047,368 | B2 | 5/2006 | Vantalon et al. |
| 7,152,801 | B2 | 12/2006 | Cuellar et al. |
| 7,233,538 | B1 | 6/2007 | Wu et al. |
| 7,395,176 | B2 | 7/2008 | Chung et al. |
| 7,409,489 | B2 | 8/2008 | Sinclair |
| 7,412,559 | B2 | 8/2008 | Stockdale et al. |
| 7,450,456 | B2 | 11/2008 | Jain et al. |
| 7,478,248 | B2 | 1/2009 | Ziv et al. |
| 7,492,368 | B1 | 2/2009 | Nordquist et al. |
| 7,571,295 | B2 | 8/2009 | Sakarda et al. |
| 7,644,938 | B2 | 1/2010 | Yamada |
| 7,697,311 | B2 | 4/2010 | Fukuda et al. |
| 7,730,248 | B2 | 6/2010 | Goss et al. |
| 7,760,569 | B2 | 7/2010 | Ruf et al. |
| 7,783,845 | B2 | 8/2010 | Bennett et al. |
| 7,809,962 | B2 | 10/2010 | Chang et al. |
| 7,889,544 | B2 | 2/2011 | Chow et al. |
| 8,094,500 | B2 | 1/2012 | Paley et al. |
| 8,180,975 | B2 | 5/2012 | Moscibroda et al. |
| 8,218,137 | B2 | 7/2012 | Noh et al. |
| 8,307,180 | B2 | 11/2012 | Hyvonen et al. |
| 8,321,713 | B2 | 11/2012 | Nobunaga |
| 8,327,123 | B2 | 12/2012 | Juffa et al. |
| 8,514,621 | B2 | 8/2013 | Choi et al. |
| 8,527,693 | B2 | 9/2013 | Flynn et al. |
| 8,639,874 | B2 | 1/2014 | Maule et al. |
| 8,656,045 | B2 | 2/2014 | Wallace et al. |
| 8,826,051 | B2 | 9/2014 | Wakrat et al. |
| 8,879,346 | B2 | 11/2014 | Kam et al. |
| 8,935,302 | B2 | 1/2015 | Flynn et al. |
| 9,003,159 | B2 | 4/2015 | Deshkar et al. |
| 9,063,724 | B2 | 6/2015 | Smith et al. |
| 9,063,850 | B2 | 6/2015 | Hyvonen et al. |
| 9,069,551 | B2 | 6/2015 | Iarovici et al. |
| 9,128,718 | B1 | 9/2015 | Lachwani et al. |
| 9,141,394 | B2 | 9/2015 | Sakarda |
| 9,367,486 | B2 | 6/2016 | Hyvonen et al. |
| 9,417,998 | B2 | 8/2016 | Mylly et al. |
| 9,424,182 | B2 | 8/2016 | Fisher et al. |
| 9,645,758 | B2 | 5/2017 | Peterson et al. |
| 9,667,425 | B2 | 5/2017 | Goss et al. |
| 9,727,454 | B2 | 8/2017 | Kuzmin et al. |
| 9,829,951 | B2 | 11/2017 | Kumar et al. |
| 9,841,911 | B2 | 12/2017 | Yu et al. |
| 9,870,327 | B2 | 1/2018 | Chen et al. |
| 9,941,007 | B2 | 4/2018 | Peddle et al. |
| 9,952,977 | B2 | 4/2018 | Heinrich et al. |
| 10,095,613 | B2 | 10/2018 | Jo et al. |
| 2002/0000931 | A1 | 1/2002 | Petronic et al. |
| 2002/0087817 | A1 | 7/2002 | Tomaiuolo et al. |
| 2002/0093913 | A1 | 7/2002 | Brown et al. |
| 2002/0108014 | A1 | 8/2002 | Lasser |
| 2003/0137860 | A1 | 7/2003 | Khatri et al. |
| 2004/0010671 | A1 | 1/2004 | Sampsa et al. |
| 2004/0049692 | A1 | 3/2004 | Okamoto |
| 2004/0221124 | A1 | 11/2004 | Beckert et al. |
| 2004/0230317 | A1* | 11/2004 | Kumar ............ G06F 3/0605 700/1 |
| 2004/0243900 | A1 | 12/2004 | Henkel |
| 2005/0138318 | A1 | 6/2005 | Ash et al. |
| 2005/0204113 | A1 | 9/2005 | Harper et al. |
| 2006/0022054 | A1 | 2/2006 | Elhamias et al. |
| 2006/0075395 | A1 | 4/2006 | Lee et al. |
| 2006/0120235 | A1 | 6/2006 | Jensen |
| 2006/0129722 | A1 | 6/2006 | Campbell |
| 2006/0174056 | A1 | 8/2006 | Lambert et al. |
| 2006/0179212 | A1 | 8/2006 | Kim et al. |
| 2006/0184758 | A1 | 8/2006 | Satori et al. |
| 2006/0224789 | A1 | 10/2006 | Cho et al. |
| 2006/0280077 | A1 | 12/2006 | Suwa |
| 2007/0079015 | A1 | 4/2007 | Royer, Jr. et al. |
| 2007/0088867 | A1 | 4/2007 | Cho et al. |
| 2007/0136523 | A1 | 6/2007 | Bonella et al. |
| 2007/0147115 | A1 | 6/2007 | Lin et al. |
| 2007/0207854 | A1 | 9/2007 | Wolf et al. |
| 2007/0226795 | A1 | 9/2007 | Conti et al. |
| 2007/0283078 | A1 | 12/2007 | Li et al. |
| 2008/0080688 | A1 | 4/2008 | Burgan et al. |
| 2008/0104291 | A1 | 5/2008 | Hinchey |
| 2008/0126857 | A1 | 5/2008 | Basham et al. |
| 2008/0162792 | A1 | 7/2008 | Wu et al. |
| 2008/0183954 | A1 | 7/2008 | Lee et al. |
| 2008/0189485 | A1 | 8/2008 | Jung et al. |
| 2008/0228984 | A1 | 9/2008 | Yu et al. |
| 2008/0244173 | A1 | 10/2008 | Takai |
| 2008/0282030 | A1 | 11/2008 | Kalwitz et al. |
| 2008/0320211 | A1 | 12/2008 | Kinoshita |
| 2009/0164705 | A1 | 6/2009 | Gorobets |
| 2009/0182962 | A1 | 7/2009 | Khmelnitsky et al. |
| 2009/0198871 | A1 | 8/2009 | Tzeng |
| 2009/0210615 | A1 | 8/2009 | Struk et al. |
| 2009/0216937 | A1 | 8/2009 | Yasufuku |
| 2009/0292861 | A1 | 11/2009 | Kanevsky et al. |
| 2009/0307544 | A1 | 12/2009 | Kim et al. |
| 2009/0313420 | A1 | 12/2009 | Wiesz et al. |
| 2009/0327584 | A1 | 12/2009 | Tetrick et al. |
| 2010/0030961 | A9 | 2/2010 | Ma et al. |
| 2010/0106886 | A1 | 4/2010 | Marcu et al. |
| 2010/0106901 | A1 | 4/2010 | Higeta et al. |
| 2010/0169558 | A1 | 7/2010 | Honda et al. |
| 2010/0169604 | A1 | 7/2010 | Trika et al. |
| 2010/0250836 | A1 | 9/2010 | Sokolov et al. |
| 2010/0268928 | A1 | 10/2010 | Wang et al. |
| 2010/0293420 | A1 | 11/2010 | Kapil et al. |
| 2010/0312947 | A1 | 12/2010 | Luukkainen et al. |

(56) References Cited

U.S. PATENT DOCUMENTS

| | | |
|---|---|---|
| 2011/0029808 A1 | 2/2011 | Moshayedi |
| 2011/0099326 A1 | 4/2011 | Jung et al. |
| 2011/0145537 A1 | 6/2011 | Feldman et al. |
| 2011/0296088 A1 | 12/2011 | Duzly et al. |
| 2012/0023303 A1 | 1/2012 | Russo et al. |
| 2012/0079171 A1 | 3/2012 | Ju et al. |
| 2012/0221875 A1 | 8/2012 | Bak et al. |
| 2012/0239990 A1 | 9/2012 | Mataya et al. |
| 2012/0324299 A1 | 12/2012 | Moshayedi |
| 2013/0007348 A1 | 1/2013 | Fai et al. |
| 2013/0282957 A1 | 10/2013 | Mylly |
| 2013/0332691 A1 | 12/2013 | Hyvonen et al. |
| 2013/0339635 A1 | 12/2013 | Amit et al. |
| 2013/0346668 A1 | 12/2013 | Floman et al. |
| 2013/0346685 A1 | 12/2013 | Hampel et al. |
| 2014/0059273 A1 | 2/2014 | Fujimoto et al. |
| 2014/0188719 A1 | 7/2014 | Poornachandran et al. |
| 2014/0304475 A1 | 10/2014 | Ramanujan et al. |
| 2015/0039819 A1 | 2/2015 | Luukkainen et al. |
| 2015/0134871 A1 | 5/2015 | Benisty et al. |
| 2015/0160863 A1 | 6/2015 | Mylly |
| 2016/0077963 A1 | 3/2016 | Luukkainen et al. |
| 2016/0246546 A1 | 8/2016 | Mylly |
| 2017/0038975 A1 | 2/2017 | Mylly et al. |
| 2017/0046067 A1 | 2/2017 | Luukkainen et al. |
| 2018/0130506 A1 | 5/2018 | Kang et al. |
| 2018/0364909 A1 | 12/2018 | Luukkainen et al. |
| 2019/0034122 A1 | 1/2019 | Mylly |

FOREIGN PATENT DOCUMENTS

| | | |
|---|---|---|
| CN | 1762025 | 4/2006 |
| CN | 101278354 A | 10/2008 |
| CN | 101329654 | 12/2008 |
| CN | 101449251 A | 6/2009 |
| CN | 101667103 A | 3/2010 |
| CN | 101714106 A | 5/2010 |
| CN | 101937318 | 1/2011 |
| CN | 101952808 | 1/2011 |
| EP | 0481716 | 4/1992 |
| EP | 0749062 A2 | 12/1996 |
| EP | 0749063 A2 | 12/1996 |
| EP | 1779241 | 2/2006 |
| EP | 1763036 | 3/2007 |
| JP | 59135563 | 8/1984 |
| JP | S64064073 A | 3/1989 |
| JP | 0268671 | 3/1990 |
| JP | H02068671 | 3/1990 |
| JP | H02170767 A | 7/1990 |
| JP | H11259357 | 9/1990 |
| JP | 06124596 | 5/1994 |
| JP | H06124596 A | 5/1994 |
| JP | H06236681 | 8/1994 |
| JP | H08123731 A | 5/1996 |
| JP | 10228413 | 8/1998 |
| JP | H10240607 | 9/1998 |
| JP | 11143643 | 5/1999 |
| JP | H11242563 | 9/1999 |
| JP | 2000003309 | 1/2000 |
| JP | 2000057039 | 2/2000 |
| JP | 2000067584 | 3/2000 |
| JP | 2002108691 | 4/2002 |
| JP | 2002259322 | 9/2002 |
| JP | 2002351741 | 12/2002 |
| JP | 2003015949 | 1/2003 |
| JP | 2003150445 | 5/2003 |
| JP | 2004021669 | 1/2004 |
| JP | 2004511030 | 4/2004 |
| JP | H03687115 B2 | 8/2005 |
| JP | 2006011818 | 1/2006 |
| JP | 2006195569 | 7/2006 |
| JP | 2006221627 | 8/2006 |
| JP | 2006520958 | 9/2006 |
| JP | 2006331408 | 12/2006 |
| JP | 2006343923 | 12/2006 |
| JP | 2007079724 | 3/2007 |
| JP | 2007115382 | 5/2007 |
| JP | 2007183962 A | 7/2007 |
| JP | 2007518166 | 7/2007 |
| JP | 3965874 B2 | 8/2007 |
| JP | 2007220210 | 8/2007 |
| JP | 2011022657 | 2/2011 |
| JP | 2011028537 | 2/2011 |
| JP | 2011039849 | 2/2011 |
| JP | 2011086064 | 4/2011 |
| JP | 2011238175 | 11/2011 |
| JP | 2013504815 A | 2/2013 |
| JP | 2013109419 | 6/2013 |
| JP | 2013176088 A | 9/2013 |
| KR | 20060082040 A | 7/2006 |
| KR | 20090033887 A | 4/2007 |
| KR | 100842140 B1 | 6/2008 |
| KR | 20100072068 A | 6/2010 |
| TW | 200701233 | 1/2007 |
| TW | 201135746 | 10/2011 |
| TW | 201209831 | 3/2012 |
| TW | 201214446 | 4/2012 |
| WO | WO88/01772 | 3/1988 |
| WO | WO01/35200 A1 | 5/2001 |
| WO | JP2002526875 A | 8/2002 |
| WO | WO2004084231 | 9/2004 |
| WO | WO2005088468 | 6/2005 |
| WO | WO2005066773 A1 | 7/2005 |
| WO | WO2012021380 | 2/2012 |

OTHER PUBLICATIONS

Chinese Office Action dated Jun. 20, 2017 for Chinese Patent Application No. 201380006769.8, a counterpart foreign application of U.S. Pat. No. 9,417,998, 8 pages.
European Office Action dated Jul. 5, 2017 for European patent application No. 09715221.9, a counterpart foreitgn application of U.S. Pat. No. 8,307,180, 6 pages.
Taiwanese Office Action dated Aug. 11, 2017 for Taiwanese patent application No. 106101747, a counterpart foreign application of U.S. Pat. No. 9,311,226.
Chinese Office Action dated Apr. 21, 2017 for Chinese Patent Application No. 201510093389.3, a counterpart foreign application of U.S. Pat. No. 8,307,180, (with English translation), 12 pages.
Office Action for U.S. Patent Application, dated Aug. 23, 2017, Mylly, "Managing Operational State Data in Memory Module", 10 pages.
Chinese Office Action dated Apr. 21, 2017 for Chinese Patent Application No. 201510093389.3, a counterpart foreign application of U.S. Pat. No. 8,307,180, 6 pages.
Translated Japanese Office Action dated Apr. 21, 2017 for Japanese patent application No. 2015-099731, a counterpart foreign application of U.S. Pat. No. 8,307,180, 6 pages.
Chinese Office Action dated Dec. 19, 2013 for Chinese patent application No. 200980106241.1, a counterpart foreign application of U.S. Pat. No. 8,307,180, 4 pages.
Chinese Office Action dated Apr. 1, 2016 for Chinese Patent Application No. 201310136995.X, a counterpart foreign application of U.S. Appl. No. 13/451,951, 8 pages.
Chinese Office Action dated Apr. 9, 2013 for Chinese patent application No. 200980106241.1, a counterpart foreign application of U.S. Pat. No. 8,307,180, 5 pages.
Translated Chinese Office Action dated Jul. 17, 2015 for Chinese patent application No. 201310136995.X, a counterpart foreign application of U.S. Appl. No. 13/451,951, 28 pages.
Chinese Office Action dated Aug. 27, 2014 for Chinese patent application No. 200980106241.1, a counterpart foreign application of U.S. Pat. No. 8,307,180, 4 pages.
European Search Report for Application No. 09715221.9, dated Oct. 25, 2011, pages.
JEDEC Standard, "Embedded MultiMediaCard (eMMC) Product Standard, High Capacity," JESD84-A42, Jun. 2007, 29 pages.
JEDEC Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.

(56) References Cited

OTHER PUBLICATIONS

JEDEC Standard, "Embedded MultiMediaCard (eMMC) Mechanical Standard," JESD84-C43, Jun. 2007, 13 pages.
Translated Japanese Office Action dated Jan. 16, 2013 for Japanese patent application No. 2010548134, a counterpart foreign application of U.S. Pat. No. 8,307,180, 6 pages.
Translated Japanese Office Action dated Jan. 7, 2015 for Japanese patent application No. 2013-103695, a counterpart foreign application of U.S. Pat. No. 8,307,180, 8 pages.
Translated Japanese Office Action dated Nov. 25, 2013 for Japanese patent application No. 2013-103695, a counterpart foreign application of U.S. Pat. No. 8,307,180, 8 pages.
Translated Japanese Office Action dated Dec. 14, 2015 for Japanese patent application No. 2013-103695, a counterpart foreign application of U.S. Pat. No. 8,307,180, 4 pages.
Translated Japanese Office Action dated Jun. 30, 2016 for Japanese Patent Application No. 2015-099731, a counterpart foreign application of U.S. Pat. No. 8,307,180, 9 pages.
Japanese Office Action dated Aug. 27, 2013 for Japanese patent application No. 2010548134, a counterpart foreign application of U.S. Pat. No. 8,307,180, 4 pages.
Japanese Search Report for Application No. 2010-548134, dated May 10, 2012, 11 pages.
Translated Korean Office Action dated Mar. 3, 2014 for Korean patent application No. 2013-7002338, a counterpart foreign application of U.S. Pat. No. 8,307,180, 5 pages.
Office Action for Korean Patent Application No. 10-2010-7021534, dated Sep. 30, 2011, 3 pages.
Lin et al., "A NAND Flash Memory Controller for SDIMMC Flash Memory Card," IEEE 2007, pp. 933-935.
Numonyz, "How to boot an embedded system from an eMMCTM equipped with a Microsoft FAT file system." Application note AN2539, Nov. 2008, pp. 1-25.
Final Office Action for U.S. Appl. No. 13/527,745, dated Jan. 16, 2015, Matti Floman, "Virtual Memory Module", 22 pages.
Office Action for U.S. Appl. No. 13/451,951, dated Jan. 7, 2014, Kimmo J. Mylly, "Managing Operational State Data in Memory Module", 24 pages.
Office Action for U.S. Appl. No. 13/951,169, dated Oct. 8, 2013, Jani Hyvonen, "Extended Utilization Area for a Memory Device", 9 pages.
Final Office Action for U.S. Appl. No. 13/451,951, dated Dec. 4, 2014, Kimmo J. Mylly, "Managing Operational State Data of a Memory Module Using Host Memory in Association with State Change", 24 pages.
Office Action for U.S. Appl. No. 14/520,030, dated Dec. 4, 2014, Olli Luukkainen, "Apparatus and Method to Share Host System RAM with Mass Storage Memory RAM", 6 pages.
Office action for U.S. Appl. No. 12/455,763, dated Mar. 14, 2014, Luukkainen et al., "Apparatus and method to share host system RAM with mass storage memory RAM", 6 pages.
Final Office Action for U.S. Appl. No. 13/951,169, dated Mar. 27, 2014, Jani Hyvonen, "Extended Utilization Area for a Memory Device", 10 pages.
Final Office Action for U.S. Appl. No. 14/520,030, dated May 20, 2015, Olli Luukkaninen, "Apparatus and Method to Share Host System RAM with Mass Storage Memory RAM", 6 pages.
Office Action for U.S. Appl. No. 13/451,951 dated Jun. 18, 2015, Kimmo J. Mylly, "Managing Operational State Data of a Memory Module Using Host Memory in Association with State Change", 33 pages.
Office action for U.S. Appl. No. 13/527,745, dated Jun. 23, 2014, Floman et al., "Virtual Memory Module", 13 pages.
Office Action for U.S. Appl. No. 14/732,507, dated Jul. 1, 2015, Jani Hyvonen, "Extended Utilization Area for a Memory Device", 11 pages.
Office action for U.S. Appl. No. 13/951,169, dated Jul. 28, 2014, Hyvonen et al., "Extended Utilization Area for a Memory Device", 6 pages.
Office action for U.S. Appl. No. 14/945,757, dated Jul. 28, 2016, Luukkainen et al., "Apparatus and Method to Share Host System RAM with Mass Storage Memory RAM", 5 pages.
Office action for U.S. Appl. No. 12/455,763, dated Aug. 1, 2013, Luukkainen et al., "Apparatus and method to share host system ram with mass storage memory ram", 28 pages.
Office action for U.S. Appl. No. 14/732,507, dated Dec. 10, 2015, Hyvonen et al., "Extended Utilization Area for a Memory Device", 9 pages.
"PCI Local Bus Specification Revision 3.0", PCI-SGI, Feb. 3, 2004, 344 pages, pp. 238-246.
PCT Search Report dated Feb. 25, 2015 for PCT application No. PCT/US2014/069616.
PCT Search Report and Written Opinion dated Apr. 16, 2014 for PCT application No. PCT/US13/49434, 8 pages.
PCT Search Report and Written Opinion dated Sep. 5, 2013 for PCT application No. PCT/US13/37298, 9 pages.
International Search Report for PCT Application No. PCT/FI2009/050083 dated Jun. 3, 2009, pages.
Taiwanese Office Action dated Oct. 6, 2016 for Taiwanese Patent Application No. 102114073, a counterpart foreign application of U.S. Pat. No. 9,311,226.
Chinese Office Action dated Nov. 30, 2016 for Chineae patent application No. 201380006769.8, a counterpart foreign application of U.S. Pat. No. 9,417,998.
Japanese Office Action dated Dec. 20, 2016 for Japanese Patent Application No. 2014-553773, a counterpart foreign application of U.S. Pat. No. 9,417,998.
Office action forOffice action for U.S. Appl. No. 14/566,547, dated Nov. 4, 2016, Mylly, "Unified Memory Type Aware Storage Module", 14 pages.
Excerpts from Patent Owner's Proposed Construction in Related ITC Matter, "Complainant's Proposed Claim Constructions with Support", SanDisk Exhibit 1026, Patent Trial and Appeal Board, *SanDisk* v. *Memory Technologies*, U.S. Pat. No. 8,307,180, May 3, 2017, 6 pgs.
Choudhury et al., "Public Key Infrastructure Implementation and Design", SanDisk Exhibit 1022, Patent Trial and Appeal Board, *SanDisk* v. *Memory Technologies*, U.S. Pat. No. 8,307,180, May 3, 2017, 320 pgs.
Declaration of Stephen Gross, Before the Patent Trial and Appeal Board, *SanDisk* v. *Memory Technologies*, U.S. Pat. No. 8,307,180, SanDisk Exhibit 1015, May 3, 2017, 3 pgs.
Exhibit A to Second Affidavit of Christopher Butler, Patent Trial and Appeal Board, *SanDisk* v *.Memory Technologies*, U.S. Pat. No. 8,307,180, SanDisk Exhibit 1021, May 10, 2017, 6 pgs.
Excerpts from Patent Owner's Proposed Construction in Related ITC Matter, "Complainant's Proposed Claim Constructions with Support", SanDisk Exhibit 1026, Patent Trial and Appeal Board, *SanDisk* v. *Memory Technologies*, U.S. Pat. No. 8,307,180, 6 pgs.
Second Affidavit of Christopher Butler from Internet Archives, May 2017, Patent Trial and Appeal Board, *SanDisk* v. *Memory Technologies*, U.S. Pat. No. 9,063,850, SanDisk Exhibit 1020, 2 pgs.
Affidavit of Christopher Butler from Internet Archives, Feb. 2017, Patent Trial and Appeal Board, *SanDisk* v. *Memory Technologies*, U.S. Pat. No. 8,307,180, SanDisk Exhibit 1011, 8 pgs.
Assignment History for U.S. Pat. No. 6,279,114, downloaded from USPTO Website Mar. 2018, 2 pg.
Assignment History for U.S. Pat. No. 7,409,489, downloaded from USPTO Website Mar. 2018, 1 pg.
Assignment History for U.S. Pat. No. 7,478,248, downloaded from USPTO Website Mar. 2018, 1 pg.
Business Wire, "CompactFlash Association Announces Availability of Revision 3.0 of the CF+ & CompactFlash Specification; Revision 3.0 Increases CF Interface Data Transfer Rate to 66MG/sec" Jan. 2005, SanDisk Exhibit 1018, Patent Trial and Appeal Board, *SanDisk* v. *Memory Technologies*, U.S. Pat. No. 8,307,180, 3 pgs.
CFA, "CF+ and CompactFlash Specification, Revision 3.0", Dec. 2004, SanDisk Exhibit 1003, Patent Trial and Appeal Board, *SanDisk* v. *Memory Technologies*, U.S. Pat. No. 8,307,180, 186 pgs.
Choudhury et al., "Public Key Infrastructure Implementation and Design", SanDisk Exhibit 1022, Patent Trial and Appeal Board, *SanDisk* v. *Memory Technologies*, U.S. Pat. No. 8,307,180, 320 pgs.
Chinese Office Action dated Dec. 15, 2017 for Chinese Patent Application No. 201510093389.3, a counterpart foreign application of U.S. Pat. No. 8,307,180.

(56) References Cited

OTHER PUBLICATIONS

"Declaration of R. Jacob Baker, Ph.D., P.E. in Support of Petition for Inter Partes Review of U.S. Pat. No. Re. 45,486", SanDisk Exhibit 1009, Mar. 2017, 146 pages.
Declaration of Stephen Gross, Before the Patent Trial and Appeal Board, *SanDisk v. Memory Technologies*, U.S. Pat. No. 8,307,180, SanDisk Exhibit 1015, 3 pgs.
Exhibit A to Second Affidavit of Christopher Butler, Patent Trial and Appeal Board, *SanDisk v. Memory Technologies*, U.S. Pat. No. 8,307,180, SanDisk Exhibit 1021, 6 pgs.
File History for U.S. Pat. No. 8,307,180, downloaded Mar. 2018 from USPTO Website, 4 pgs.
File History for U.S. Pat. No. 9,063,850, downloaded Mar. 2018 from USPTO Website, 4 pgs.
IBM Dictionary of Computing, Tenth Edition Aug. 1993, Definition of "Register", SanDisk Exhibit 1020, Patent Trial and Appeal Board, *SanDisk v. Memory Technologies*, U.S. Pat. No. 8,307,180, 3 pgs.
JEDEC, "MuliMediaCard Association (MMCA) and the JEDEC Solid State Technology Association (JEDEC) Announce eMMC for Embedded Flash Memory Applications", Dec. 2006, SanDisk Exhibit 1022, Patent Trial and Appeal Board, *SanDisk v. Memory Technologies*, U.S. Pat. No. 9,063,850, 4 pgs.
McGraw-Hill Electronics Dictionary, Sixth Edition 1997, Definition of "Register", SanDisk Exhibit 1013, Patent Trial and Appeal Board, *SanDisk v. Memory Technologies*, U.S. Pat. No. 8,307,180, 3 pgs.
"The MultiMediaCard", System Specification, Version 3.31, MMCA Technical Committee, SanDisk Exhibit 1009, Patent Trial and Appeal Board, *SanDisk v. Memory Technologies*, U.S. Pat. No. 8,307,180, 150 pgs.
Taiwanese Office Action dated Jan. 18, 2018 for Taiwanese Patent Application No. 106101747, a counterpart foreign application of U.S. Pat. No. 9,311,226.
Horak, Webster's New World Telecom Dictionary Copyright 2008, Definition of "Register", SanDisk Exhibit 1027, Patent Trial and Appeal Board, *SanDisk v. Memory Technologies*, U.S. Pat. No. 8,307,180, 4 pgs.
Final Office Action for U.S. Appl. No. 15/235,425, dated Jun. 12, 2018, Mylly, "Apparatus and Method to Provide Cache Move With Non-Volatile Mass Memory System", 16 pages.
Affidavit of Chistopher Butler, dated Jan. 18, 2019, Internet Archives, Kingston Exhibit 1023, *Kingston Technology Co. v. Memory Technologies* Petition for Inter Partes Review, 2 pgs.
Declaration of Michael Asao, dated Jan. 24, 2019, Kingston Exhibit 1025, *Kingston Technology Co. v. Memory Technologies* Petition for Inter Partes Review, 4 pgs.
Declaration of R. Jacob Baker dated Jan. 29, 2019, Kingston Exibit 1002, *Kingston Technology Co. v. Memory Technologies* Petition for Inter Partes Review, 236 pgs.
Exhibit A to Affidavit of Chistopher Butler, dated Jan. 18, 2019, Kingston Exhibit 1024, *Kingston Technology Co. v. Memory Technologies* Petition for Inter Partes Review, 15 pgs.
Final Office Action dated Feb. 8, 2019 for U.S. Appl. No. 15/235,425 "Apparatus and Method to Provide Cache Move with Non-Volatile Mass Memory System" Mylly, 18 pages.
Prosecution history for U.S. Pat. No. 8,307,180, Exhibit 1009, *Kingston Technology Co. v. Memory Technologies* Petition for Inter Partes Review dated Jan. 30, 2019, 597 pages.
Prosecution history for U.S. Pat. No. 9,063,850, Exhibit 1012, *Kingston Technology Co. v. Memory Technologies* Petition for Inter Partes Review dated Jan. 30, 2019, 659 pages.
Prosecution history for U.S. Pat. No. 9,367,486, Exhibit 1009, *Kingston Technology Co. v. Memory Technologies* Petition for Inter Partes Review dated Jan. 30, 2019, 286 pages.
Excerpts of Apr. 17, 2017 Third Joint Claim Construction and Prehearing Statement (N.D. Cal. Patent L.R. 4-3) filed in related matter on Nov. 16, 2018, Kingston Exhibit 1022, *Kingston Technology Co. v. Memory Technologies* Petition for Inter Partes Review, 6 pgs.
Japanese Office Action dated Oct. 1, 2018 for Japanese patent application No. 2017-156699, a counterpart foreign application of U.S. Pat. No. 8,307,180, 11 pages.
Translated Chinese Office Action dated Mar. 12, 2019 for Chinese Patent Application No. 201610905925X, a counterpart of U.S. Pat. No. 9,311,226, 7 pages.
Extended European Search Report dated May 8, 2019 for European Patent Application No. 18215330.4, 8 pages.
Translated Japanese Office Action dated Jul. 269, 2019 for Japanese patent application No. 2017-156699, a counterpart foreign application of U.S. Pat. No. 8,307,180.
Translated Korean Office Action dated May 29, 2019 for Korean Patent Application No. 2014-7019265, a counter part of U.S. Pat. No. 9,417,998, 17 pages.
Office Action for U.S. Appl. No. 15/235,425, dated Jun. 14, 2019, Mylly, "Apparatus and Method to Provide Cache Move with Non-Volatile Mass Memory System"m 17 pages.
Extended European Search Report dated Mar. 22, 2019 for European Patent Application No. 18213772, 8 pages.
Office action for U.S. Appl. No. 15/989,695, dated Apr. 11, 2019, Luukkainen et al., "Apparatus and Method to Share Host System RAM with Mass Storage Memory RAM", 9 pages.
"Decision" in *Kinston Technology Company v. Memory Technologies*, before the Patent Trial and Appeal Board, Case IPR2019-00642, U.S. Pat. No. 8,307,180 B2, Jul. 30, 2019, 37 pages.
"Termination Due to Settlement After Institution of Trial" in *Kinston Technology Company v. Memory Technologies*, before the Patent Trial and Appeal Board, Case IPR2019-00642 (U.S. Pat. No. 8,307,180 B2) dated Sep. 10, 2019, 4 pgs.
"Termination Due to Settlement After Institution of Trial" in *Kinston Technology Company v. Memory Technologies*, before the Patent Trial and Appeal Board, Case IPR2019-00643 (Patent RE. 45,486 E) dated Sep. 10, 2019, 4 pgs.
"Termination Due to Settlement After Institution of Trial" in *Kinston Technology Company v. Memory Technologies*, before the Patent Trial and Appeal Board, Case IPR2019-00645 (U.S. Pat. No. 9,367,486 B2) dated Sep. 10, 2019, 4 pgs.
"Termination Due to Settlement After Institution of Trial" in *Kinston Technology Company v. Memory Technologies*, before the Patent Trial and Appeal Board, Case IPR2019-00648 (U.S. Pat. No. 9,063,850 B2) dated Sep. 10, 2019, 4 pgs.
Taiwanese Office Action dated Jul. 16, 2019 for Taiwanese Patent Application No. 107132459, a counterpart of U.S. Pat. No. 9,311,226, 5 pages.
"1G x 8 Bit / 2G x 8 Bit / 4G x 8 Bit NAND Flash Memory", Nov. 4, 2005, Samsung Electronics—K9XXG08UXM. 50 Pages.
"SD Specifications: Part 1 Physical Layer Specification" Oct. 15, 2004, Version 1.10, SD Group (MEI, ScanDisk, Toshiba) and SD Card Association, 164 pages.
Non Final Office Action dated Oct. 9, 2019 for U.S. Appl. No. 15/235,425 "Apparatus and Method to Provide Cache Move with Non-Volatile Mass Memory System" Mylly, 19 pages.
Chinese Office Action dated Sep. 16, 2019 for Chinese Patent Application No. 201610905925X, a counterpart of U.S. Pat. No. 9,311,226, 6 pages.
Final Office Action dated Oct. 10, 2019 for U.S. Appl. 15/989,695 "Apparatus and Method to Share Host System RAM With Mass Storage Memory RAM", Luukkainen, 9 pages.
Pedersen, Lynne; Design for MISP: A Multiple Instruction Stream Shared Pipeline Processor; University of Illinois at Urbana-Champaign, 1985 (201 pages).
Powers, Susan et al; AS/400 Disk Storage Topics and Tools; International Technical Support Organization; International Business Machines; Apr. 2000 (252 pages).
Office Action for U.S. Appl. No. 16/054,582, dated Nov. 15, 2019, Mylly, "Managing Operational State Data in Memory Module", 7 Pages.

\* cited by examiner

EXTENDED UTILIZATION AREA FOR A MEMORY DEVICE

PRIORITY APPLICATION(S)

This Application is a continuation of and claims priority to pending U.S. patent application Ser. No. 14/732,507, filed Jun. 5, 2015, which is a continuation of U.S. patent application Ser. No. 13/951,169, filed Jul. 25, 2013 and issued as U.S. Pat. No. 9,063,850, which is a continuation of U.S. patent application Ser. No. 13/645,588, filed Oct. 5, 2012 and issued as U.S. Pat. No. 8,601,228, which is a continuation of U.S. patent application Ser. No. 12/039,672, filed Feb. 28, 2008 and issued as U.S. Pat. No. 8,307,180, all of which are incorporated herein by reference.

FIELD OF INVENTION

The present invention relates generally to memory devices. In particular, the present invention relates to providing systems, methods and devices for run-time configuration of mass memory devices.

BACKGROUND OF THE INVENTION

In a typical environment involving digital data processing and/or data communications, memory devices are invoked for a variety of reasons, for example, to read, write, modify, delete, or change the attributes of the data that resides on a memory device. These operations (hereinafter referred to as memory 'access' operations) may be targeted to access varying chunks of data according the needs of an application program that invokes the specific memory access operation. For example, an application may require access to a small chunk of data from random addresses, the same address, or sequential addresses on the memory device. Similarly, the same or a different application may require access to large chunks of data from random addresses, the same address, or sequential addresses on the memory device. Examples of the different applications that may access a memory device include file systems, different databases, kernel reading code pages, and other applications that use the memory device.

It is often the case that a mass memory device is optimized for one kind of application, or a defined group of applications, with particular memory access characteristics. This optimization, for example, may entail optimization of data throughput, life time and/or power consumption associated with the memory device. Due to this fixed optimization strategy, when a memory device is placed into a different environment with new access demands, it may fail to optimally perform under the requirements of the new environment. The lack of flexibility in optimizing such memory devices may be partly due to inherent limitations that render these memory devices incapable of accommodating optimized functionalities for multiple kinds of access operations. In other cases, however, the reason for electing to a memory device for a defined, and thus limited, group of applications is to simplify the design, and to effect cost savings. In addition, it is generally very difficult for a memory device to predict access requirements that are necessitated by yet-to-be determined future application needs.

SUMMARY OF THE INVENTION

A method, system and memory device are therefore provided to overcome the deficiencies of the prior art systems by allowing run-time configuration of a mass memory device. In one embodiment of the present invention a method for configuring access to a memory device is provided. The method comprises receiving one or more commands for activating one or more access profiles associated with the memory device, and configuring access to the memory device in accordance with at least one of the access profiles. The access profiles may correspond to at least one of a random and a sequential mode of access. The access profiles may further correspond to at least one of a read, a write, an erase, and a modify attribute operation.

In another embodiment of the present invention, one or more access profiles are adapted to accommodate repeated access requests to an identical address of the memory device. In another embodiment, one or more access profiles are adapted to produce an optimized performance associated with the memory device. Furthermore, the performance may be optimized in accordance with at least one of: data throughput, lifetime, and power consumption associated with the memory device.

In another embodiment of the present invention, one or more received commands comprise a metadata portion for designating a preferred access profile corresponding to the command. Furthermore, a specific memory location may be utilized in accordance with the access profile. In one embodiment, the specific memory location may comprise a section of the memory device with special characteristics. For example, it may include a more durable and performance-effective portion of the physical memory, or a portion of the memory that utilizes a specific memory technology. In another embodiment, the specific memory location may comprise a separate physical memory chip.

In another embodiment of the present invention, one or more access profiles are associated with one or more partitions of the memory device. Yet, in another embodiment, the configuring of the memory device is adapted in parallel for two or more parallel access profiles. In one embodiment, such configuring is carried out in accordance with JESD84 standard for eMMC. This configuring may further comprise designating access priority levels to resolve simultaneous access conflicts to memory resources. In another embodiment of the present invention, the memory device is used to effect both mass memory and system memory implementations. In another embodiment, a default access profile may be used to configure the memory device upon power up.

Another aspect of the present invention relates to a memory device that comprises one or more registers for storing one or more predefined access profiles associated with the memory device. The memory device also comprises receiving means for receiving one or more commands for activating one or more access profiles associated with the memory device, and configuring means for configuring access to the memory device in accordance with at least one of the predefined access profiles. In another embodiment, a currently active access profile may reside in a designated memory register. In another embodiment, one or more of the predefined access profiles may be updated with a new version of the access profile.

In another embodiment of the present invention, a computer program product embodied on a computer-readable medium is disclosed. The computer program product comprises a computer code for receiving one or more commands for activating one or more access profiles associated with the memory device, and a computer code for configuring access to the memory device in accordance with at least one of the access profiles. In another embodiment, a system for accessing a memory device is disclosed. The system comprises an entity for receiving one or more commands for activating one or more access types associated with the memory device, and an entity for configuring access to the memory device in accordance with at least one of the access profiles. In another embodiment, a system for accessing a memory device is disclosed. The system comprises a host for issuing one or more commands in accordance with access needs for the memory device, and an entity for receiving the commands and configuring access to the memory device in accordance with at least one or more access profiles.

Those skilled in the art will appreciate that various embodiments discussed above, or parts thereof, may be combined in a variety of ways to create further embodiments that are encompassed by the present invention.

DETAILED DESCRIPTION OF VARIOUS EMBODIMENTS

Figure 1:
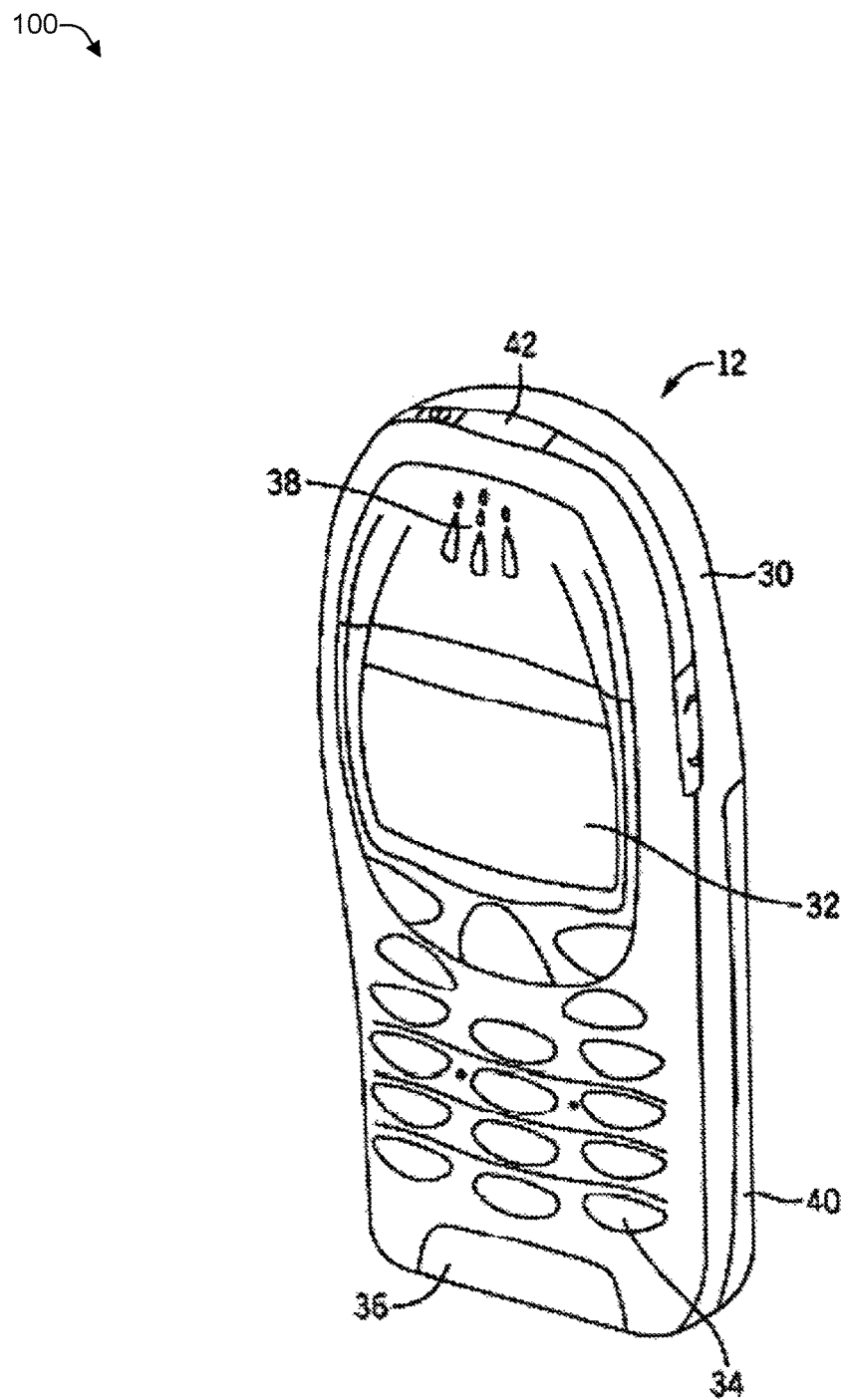
FIG. 1 illustrates a perspective view of an exemplary electronic device within which various embodiments of the present invention may be implemented.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

The problem of configuring a memory device for use in different environments has been traditionally addressed by using separate memory devices in systems with different use cases. For example, a system may utilize a mass memory device separate from a system memory device to accommodate different memory access demands.

The various embodiments of the present invention disclose methods, systems and devices to enable run-time configuration of a memory device in accordance with certain memory access profiles. The configuration may be effected for a portion of the memory device, a partition of the memory device, or even one single access location on the memory device. Since the system that accesses the memory device knows, or is capable of determining, the type of memory access needs (e.g., whether it is a read, write, erase, modify attribute, random, or a sequential operation), it can issue commands for configuring the memory device in accordance with an access profile that is most optimized/suitable for the particular access command. Such access profiles, for example, may be adapted for optimizing data throughput, lifetime and/or power consumption associated with particular uses of the memory device. In addition, according to the embodiments of the present invention, a default access profile may be defined to configure a memory device when, for example, the device or system initially boots up. Such a default profile, while providing a starting point for potential future modifications, may be pre-selected to accommodate the most likely access needs for that memory device. This profile may remain in effect until the memory device is powered down, or it may be replaced by another profile in accordance with the embodiments of the present invention.

In accordance with embodiments of the present invention, the information regarding the nature and type of memory access allows the memory device to organize itself in a manner that is most suited for a particular access command, resulting in improved performance and higher reliability. These improvements are largely due to the elimination of background operations and unnecessary data merging that are normally associated with traditional memory access methods. Although effective in both the random and sequential memory access modes, the techniques of the various embodiments of the present invention may be more effective in optimizing sequential memory access operations, where background processing and data merging are more abundant. These optimizations further extend the life of the storage device, and result in reduced energy consumption by the device.

The embodiments of the present invention further enable the utilization of the same memory device both as the mass storage memory and the system memory, thus eliminating the need for separate memory devices that are utilized in the systems of prior art. For example, all non-volatile memory needs of a system may be accommodated using a single eMMC memory, where the Operating System image, user data, and other parameters may be stored on the same device. Similarly, in multimedia applications that require very high density mass storage devices (e.g., in the order of several Gigabytes), the very same memory device may be used to store the various types of user applications, the Operating System and other system data files. This consolidation is expected to further spur the adoption of a standardized memory device with higher production volumes, and to eventually lead to lower-cost memory devices. The advent of such cost-effective, single-memory devices are particularly beneficial to the development of mobile devices in which size and cost constraints are most significant.

Figure 5:
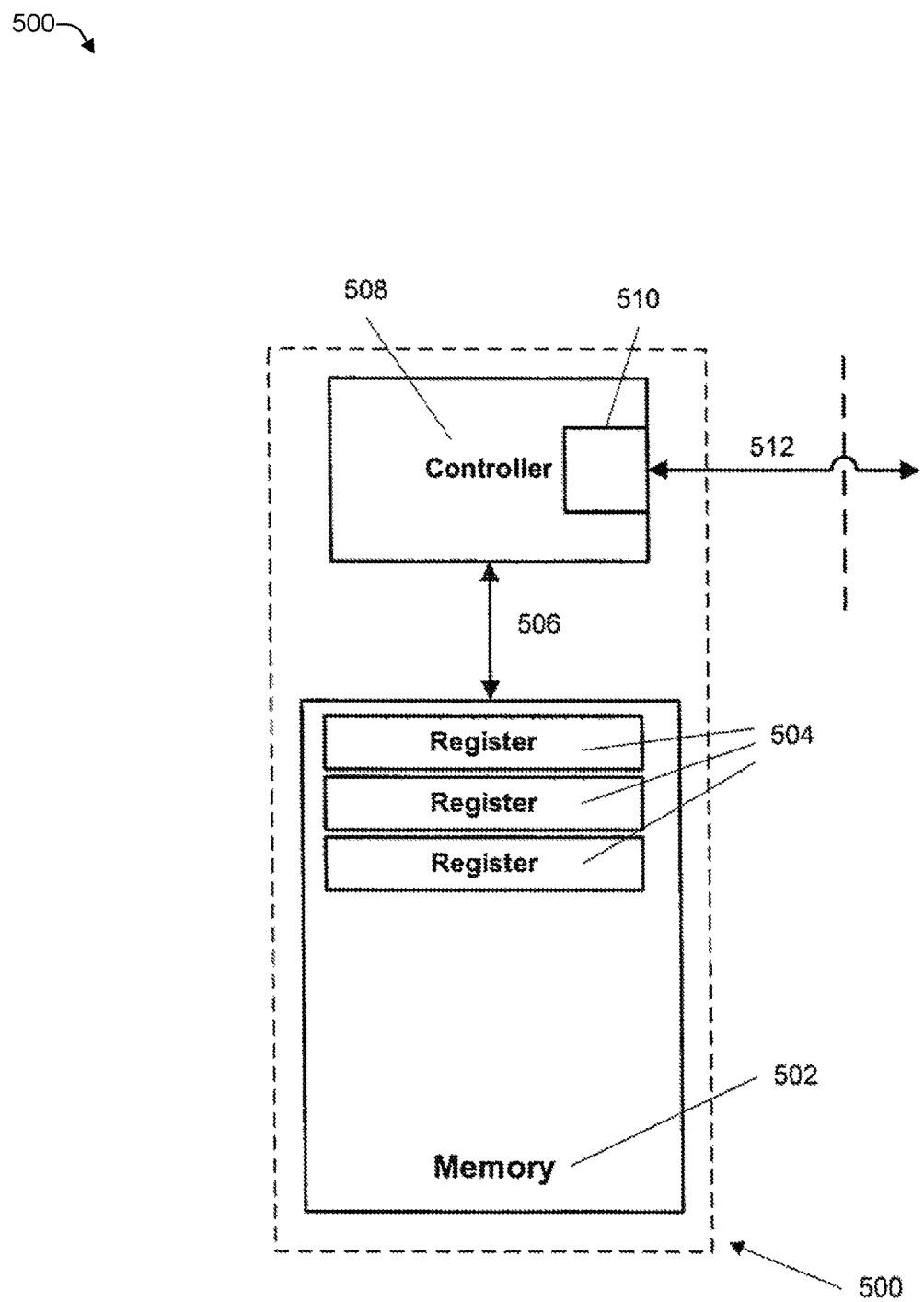
FIG. 5 illustrates an exemplary device in accordance with an embodiment of the present invention.

In accordance with one embodiment of the present invention, as illustrated in FIG. 5, a memory device 500 may comprise a physical memory 502 with one or more registers 504 for accommodating the predefined access profiles that are used to optimize the memory device. The memory device 500 may further comprise a receiving means 510 that is adapted to receive one or more commands, through the communication interface 512, for activating a particular access profile. To facilitate understanding of the present embodiment, the receiving means 510 is illustrated as comprising a separate section of the controller 508. However, it is understood that the receiving means 510 and the controller 508 may also be implemented as a single entity. Upon the receipt of one or more commands, the controller 508 may configure the memory device 500 in accordance with one or more access profiles that reside in memory registers 504. The communication between the controller 508 and the physical memory 502 may be conducted through the interface 506.

By the way of example, and not limitation, one predefined access profile may be a burst mode profile that facilitates high-speed transfer of large data chunks and provides a 'ready' indication to the host prior to, or after, such transfer. In order to minimize the transfer time, the needed flash memory management operations may take place subsequent to the transfer at a convenient time, for example, while no other activities or memory access operations are taking place. Another example of an access profile includes a random mode profile which enables quick access to short, random memory locations on the device. The memory device in accordance with embodiments of the present invention may further comprise another register for accommodating the currently active access profile. This profile, which may be any one of the supported predefined profiles, governs the current access operations to the memory device. For example, such register may comprise a default profile that is activated during the boot up of the host system and/or the power up of the memory device. This active profile may remain in effect until the memory device is powered down, or it may be replaced by another profile in accordance with the embodiments of the present invention. Run-time configurability of the memory device in accordance with the present invention is effected by replacing the contents of the currently active profile register with one of the predefined profiles that resides on the first set of registers. Accordingly, when the need for a new type of memory access arises, a command may be issued to activate a suitable profile. The command may activate any one of the predefined access profiles, including but not limited to, the default profile.

In accordance with another embodiment, the various access profiles may be updated or uploaded onto the memory device. For example, an existing access profile may be augmented (or completely replaced with a new version) to add or remove certain features and functionalities. Alternatively, or additionally, an entirely new access profile may be uploaded to the memory device, thus increasing the number of available access profiles that can be readily used to configure the memory device. By the way of example, and not by limitation, an access profile may be implemented as a binary file that further comprises the required logic to implement an access profile. This way, the access profile may be considered part of the memory device firmware responsible for handling specific accesses needs in an optimized fashion.

Figure 2:
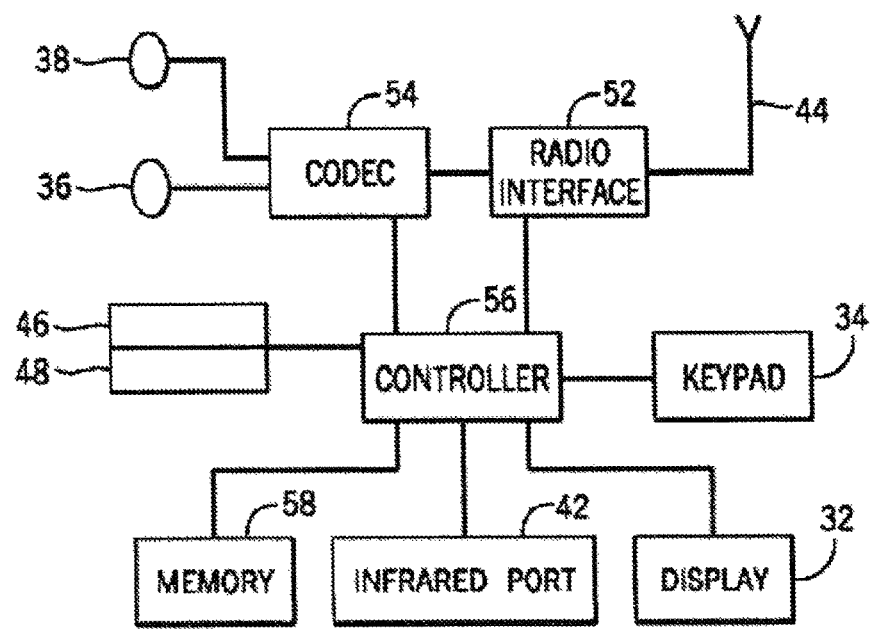
FIG. 2 illustrates an exemplary schematic representation of the circuitry which may be included in the electronic device of FIG. 1.

FIGS. 1 and 2 show one representative electronic device 12 within which embodiments of the present invention may be implemented. It should be understood, however, that the present invention is not intended to be limited to one particular type of device. In fact, the various embodiments of the present invention may be readily adapted for use in any stand-alone or embedded system that comprises or accesses a memory device. The electronic device 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Figure 3:
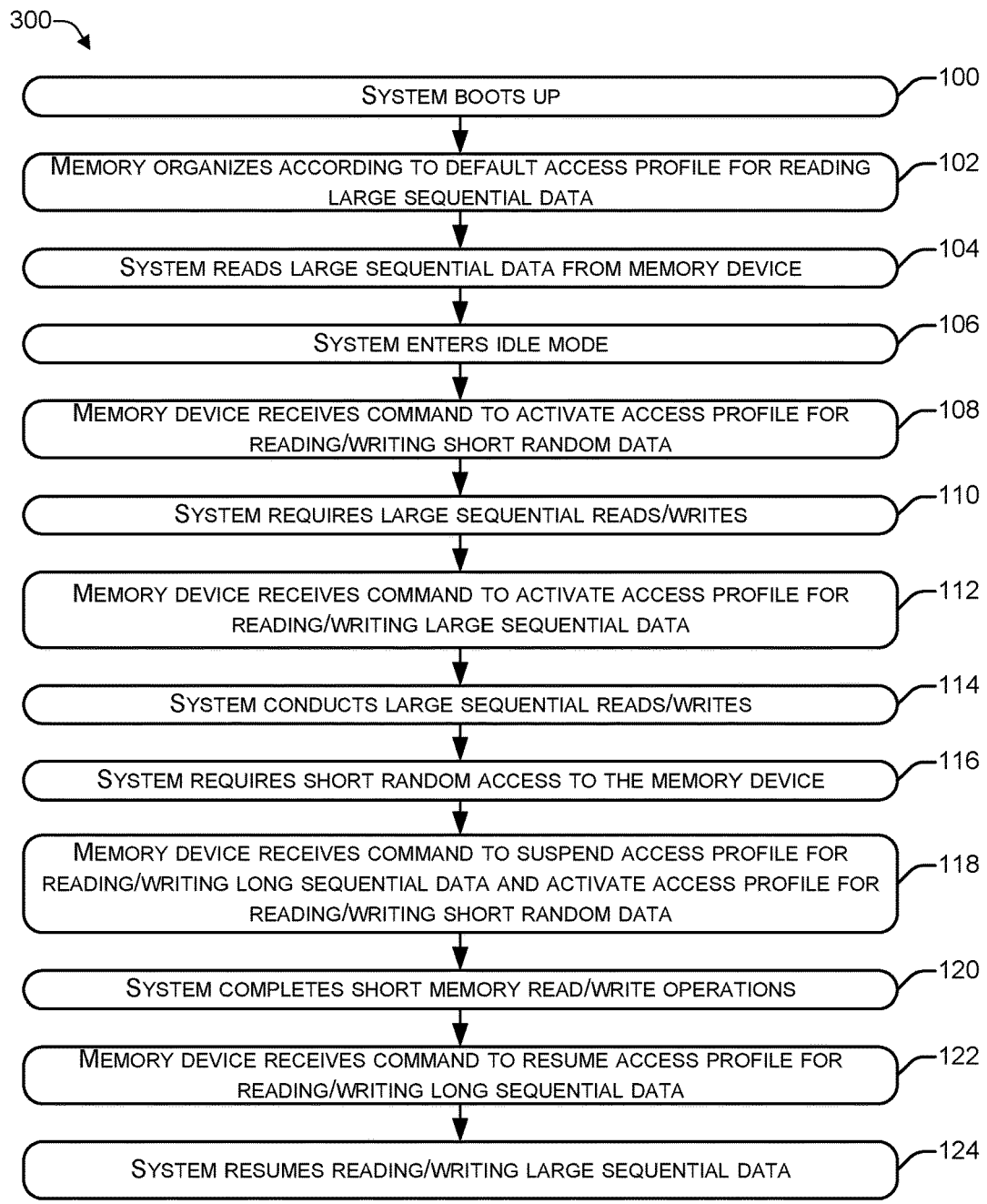
FIG. 3 illustrates a flow diagram of an exemplary embodiment of the present invention.

FIG. 3 is an example flow diagram illustrating run-time configurability of a memory device in accordance to an embodiment of the present invention. As illustrated in FIG. 3, upon boot up of the system in step 100, the memory device in accordance with embodiments of the present invention organizes itself according to the default profile in step 102. The exemplary default profile used in FIG. 3 configures the memory device to accommodate the reading of large sequential data from the memory device. In step 104, the system reads a large amount of sequential data, which for example, may comprise the operating system of the host device. Upon completion of the large read operation, the system enters an idle state in step 106. Since the majority of memory access operations during an idle state is likely to involve short random read/write operations, the memory device, in step 108, is commanded to activate an access profile for reading/writing short random data. In Step 110, the system requires large sequential reads/writes. By the way of example, and not by limitation, this need may arise when the system is connected to an external mass storage device. Such a mass storage device may, for example, include a stand-alone memory device such as a USB memory, or a PC or other electronic device that comprises one or more mass storage components. In anticipation of large data transfers to/from the external memory device, the memory device in accordance with embodiments of the present invention, in step 112, receives a command to activate the access profile that is optimized for reading/writing large sequential data. In step 114, the system conducts at least a portion of the large sequential read/write transfer. While the large data access operations may be completed without further interruptions, in one exemplary embodiment, the system of the present invention may need to access the memory device in short, random I/O access cycles, as illustrated in step 116. In accordance with one embodiment of the present invention, in step 118, the memory device may receive a command to suspend its current access profile, which is directed towards reading/writing long sequential data, and activate an alternate access profile that is optimized for reading/writing short random data. Once the system completes short memory access operations in step 120, the memory device, in step 122, may receive a subsequent command to revert back to the access profile for reading/writing large sequential data. The system may then resume reading/writing large sequential data in step 124.

Figure 4:
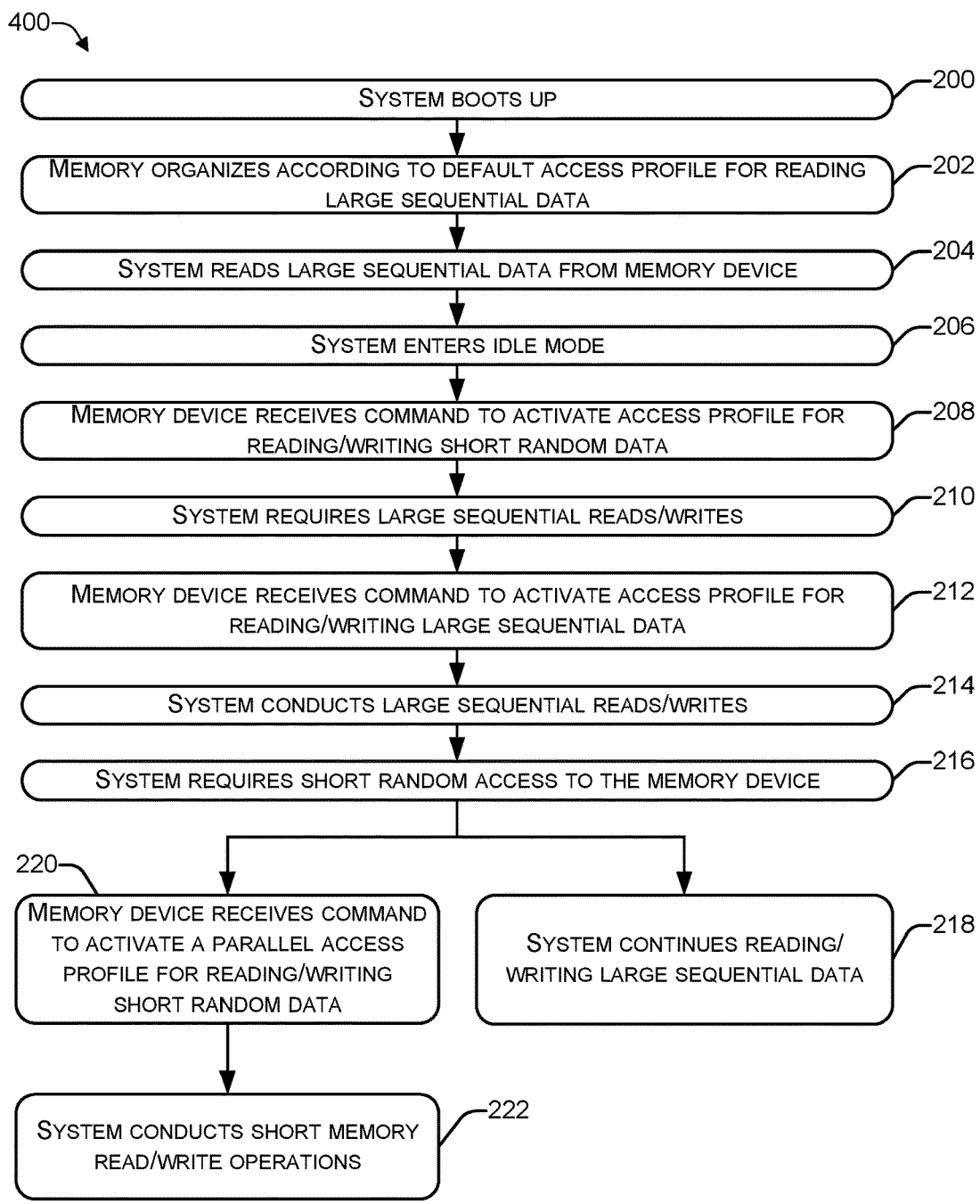
FIG. 4 illustrates a flow diagram of another exemplary embodiment of the present invention.

As describe above, the example embodiment of the present invention as illustrated in FIG. 3 suspends the large data transfer while conducting short I/O access operations. However, in some applications, it may be advantageous to conduct two or more memory access operations in parallel. To this end, FIG. 4, illustrates an alternate embodiment of the present invention according to which two or more memory access operations (and their corresponding access profiles) may be implemented in parallel. In FIG. 4, steps 200 to 216 represent similar operations as their counterparts in FIG. 3. Specifically, upon boot up in step 200, the memory device in accordance with embodiments of the present invention organizes itself according to the default profile in step 202. The exemplary default profile used in FIG. 4 configures the memory device to accommodate the reading of large sequential data from the memory device. In step 204, the system reads a large amount of sequential data, which for example, may comprise the operating system of the host device. Upon completion of the large read operation, the system enters an idle state in step 206. Since the majority of memory access operations during an idle state is likely to involve short random read/write operations, the memory device, in step 208, is commanded to activate an access profile for reading/writing short random data. The system may then require access to large sequential reads/writes in step 210. This need may arise, for example, in preparation for large data transfers to/from an external memory device. The memory device in accordance with embodiments of the present invention, in step 212, receives a command to activate the access profile that is optimized for reading/writing large sequential data. In step 214, the system conducts at least a portion of the large sequential read/write transfers before the system need for short read/write access cycles to the memory device arises in step 216. In contrast to the example embodiment of the present invention in accordance with FIG. 3, the present embodiment in accordance with FIG. 4 accommodates both memory access modes by commanding the memory device in accordance with embodiments of the present invention to activate a parallel access profile for reading/writing short random data in step 220. Accordingly, while the system continues to read/write large sequential data in step 218, it may simultaneously (or in an interleaved fashion) conduct short memory access operations in step 222.

While the embodiment of the present invention in accordance with FIG. 4 was described in terms of only two simultaneous access profiles, it is understood that similar operations may be carried out to allow the implementation of more than two access profiles in parallel. One specific parallel implementation of memory access profiles may be realized in a format that is compatible with the current JEDEC JC64 eMMC version 4.3 (JESD84). JEDEC eMMC is a standardized mass storage device comprising a memory and a controller device. The controller handles block-management functions associated with the memory such as logical block allocation and wear leveling. The communication between the memory and the host device is also handled by the controller according to a standard protocol. This protocol defines, among other signals, a bidirectional command signal, CMD, that is used for device initialization, and transfer of commands between the host and memory device. More specifically, CMD23 (SET_BLOCK_COUNT) defines the number of blocks (read/write) and the reliable writer parameter (write) for a block read/write command. CMD23 includes a 32 bit argument field, of which bits 15 to 0 are allocated for setting the number of blocks for the corresponding read/write command, and bits 30 to 16 are designated as stuff bits. In accordance to one embodiment of the present invention, these stuff bits may be utilized to designate different access profiles for the memory device. By the way of example, and not by limitation, one profile may be defined as a burst profile mode, corresponding to a fast, contiguous data access mode.

When in burst profile mode, the memory device, immediately after receiving all the data, may indicate "exit busy" and set the transfer mode to "transfer state," thus facilitating faster execution of subsequent accesses by the host. In addition, while the commands corresponding to the first access profile are still being executed, the memory device may also enable the host to send additional commands corresponding to a different access profile. This way, a degree of parallelism in the I/O operations is established. Furthermore, access priority levels may be defined to resolve access conflicts, where two or more profiles run in parallel and require access to the same memory resource at the same time. Examples of such a memory resources include a RAM buffer, a Flash bus, and other memory resources.

In accordance with another embodiment of the present invention, the access profile associated with a media device may be adapted to comprise different control and/or setting profiles that are associated with different partitions of the memory device. Such partitions may comprise logical or physical partitions of the memory device. For example, one partition may be configured for random read/write operations while another partition may be configured to provide sequential access.

In accordance with another embodiment of the present invention, a memory access (e.g., an I/O read/write) command may be configured to comprise a metadata portion for designating a preferred access profile corresponding to that access command. For example, the system in accordance with the present invention may recognize that one address is being continuously and frequently updated, and accordingly, it may set an appropriate access profile for that memory command. The memory device—depending on its internal implementations and capabilities—may map such sustained and specific access operations to certain sections of the physical memory with special characteristics. For example, the mapping may be directed to a more a more durable and performance-effective portion of the physical memory, a portion of the memory that utilizes a specific memory technology, or to a separate physical chip that is more suitably designed for such repeated access operations. Thus, the memory device firmware may take an action in accordance with the access profile request of an embodiment of the present invention and handle the 110 operation in a different way.

The various embodiments of the present invention are equally applicable to both the embedded memory devices, such as NAND, mass memory, XiP, and similar devices, as well as to removable memory cards.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A memory device comprising:
two or more predefined access types to determine how access to the memory device is configured for at least one usage of the memory device, wherein the two or more predefined access types correspond to two or more of a sequential write access, a sequential read access, a random write access, and a random read access; and
a controller configured to:
receive, from a host, a command indicative of one or more access needs, the command including a metadata portion for designating at least one of the two or more predefined access types and information for designating at least a portion of the memory device according to the at least one of the two or more predefined access types for the at least one usage; and configure, based at least in part on the one or more access needs and the information, access to the memory device in accordance with at least one of the two or more predefined access types such that the at least the portion of the memory device is configured according to the at least one of the two or more predefined access types for the at least one usage.

2. The memory device of claim 1, wherein the one or more access needs are received via one or more commands that invoke the at least one of the two or more predefined access types, wherein the one or more commands comprise the command.

3. The memory device of claim 2, wherein the information is first information, and wherein the one or more commands comprise second information settable to invoke the at least one of the two or more predefined access types, the second information comprising one or more bits that have been set, by the host, to invoke the at least one of the two or more predefined access types.

4. The memory device of claim 2, wherein the information comprises one or more bits that have been set, by the host, to designate the at least the portion of the memory device.

5. The memory device of claim 1, wherein the at least the portion of the memory device comprises a number of blocks.

6. The memory device of claim 1, wherein the at least the portion of the memory device comprises a logical portion of the memory device or a physical partition of the memory device.

7. The memory device of claim 1, wherein a first portion of the memory device is configured in accordance with a first access type of the two or more predefined access types and a second portion of the memory device is configured in accordance with a second access type of the two or more predefined access types.

8. A method comprising:
receiving, at a memory device and from a host, one or more commands in accordance with access needs for the memory device to use a first predefined access type of at least the first predefined access type and a second predefined access type, wherein the first predefined access type corresponds to a sequential mode of access, and wherein the one or more commands comprise information designating at least a portion of the memory device according to the first predefined access type for at least one usage; and
configuring, by a controller of the memory device and based at least in part on the one or more commands, access to the memory device in accordance with the first predefined access type such that the at least the portion of the memory device is configured according to the first predefined access type for the at least one usage.

9. The method of claim 8, wherein the information is first information, and wherein the one or more commands further comprise second information settable to activate the first predefined access type, the second information comprising one or more bits that have been set, by the host, to activate the first predefined access type.

10. The method of claim 8, wherein the information comprises one or more bits that have been set, by the host, to designate the at least the portion of the memory device.

11. The method of claim 8, wherein the at least the portion of the memory device comprises a number of blocks.

12. The method of claim 8, wherein the sequential mode of access comprises a sequential write mode.

13. The method of claim 8, wherein the sequential mode of access comprises a sequential read mode.

14. A host device comprising:
an interface to couple the host device to a memory device; and
a controller configured to:
determine at least one mode of access from a plurality of modes of access to be performed in association with the memory device, wherein the plurality of modes of access comprises a sequential mode of access;
set information in one or more commands to designate a portion of the memory device that is to be configured according to a predefined access type associated with the sequential mode of access;
determine that multiple sequential accesses are associated with the portion of the memory device;
send the one or more commands and an indication of one or more access needs from the host device to the memory device that is coupled to the host device, the one or more access needs capable of invoking the predefined access type associated with the sequential mode of access; and
perform the multiple sequential accesses associated with the portion of the memory device.

15. The host device of claim 14, wherein the information is first information, and wherein the controller is further configured to set second information in the one or more commands to indicate the one or more access needs capable of invoking the predefined access type, the second information comprising one or more bits.

16. The host device of claim 14, wherein the information comprises one or more bits.

17. The host device of claim 14, wherein the portion of the memory device comprises a number of blocks.

18. The host device of claim 14, wherein the sequential mode of access comprises a sequential write mode.

19. The host device of claim 14, wherein the sequential mode of access comprises a sequential read mode.

20. A memory device comprising:
one or more access types capable of configuring the memory device for at least one usage, wherein a particular access profile of one or more access profiles corresponds to a sequential read or write mode of access; and
a controller configured to:
receive, from a host, one or more commands that include an access attribute associated with the particular access profile and one or more bits settable, by the host, to designate a portion of the memory device that is configured according to the particular access profile for the at least one usage; and
configure, based at least in part on the one or more commands, the memory device to replace a default access profile with the particular access profile.

21. The memory device of claim 20, wherein the one or more bits are one or more first bits, and wherein the one or more commands comprise:
one or more second bits settable, by the host, to include the access attribute.

22. The memory device of claim 20, wherein the default access profile is pre-selected to accommodate a most likely access need for the memory device.

* * * * *